United States Patent
Muller

(10) Patent No.: US 8,596,315 B2
(45) Date of Patent: Dec. 3, 2013

(54) FUELLING SYSTEM FOR FUELLING OF A VEHICLE TANK

(75) Inventor: Manfred Muller, Georgensgmund (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 408 days.

(21) Appl. No.: 13/057,169

(22) PCT Filed: Aug. 12, 2009

(86) PCT No.: PCT/IB2009/053571
§ 371 (c)(1),
(2), (4) Date: Feb. 2, 2011

(87) PCT Pub. No.: WO2010/020916
PCT Pub. Date: Feb. 25, 2010

(65) Prior Publication Data
US 2011/0139779 A1      Jun. 16, 2011

(30) Foreign Application Priority Data
Aug. 22, 2008   (DE) .......................... 10 2008 039 311

(51) Int. Cl.
B65B 1/04       (2006.01)
B60K 15/04      (2006.01)
(52) U.S. Cl.
CPC ...................................... B60K 15/04 (2013.01)
USPC ........................... 141/350; 141/312; 220/86.2
(58) Field of Classification Search
USPC .................................. 141/312, 350; 220/86.2
See application file for complete search history.

(56) References Cited

U.S. PATENT DOCUMENTS

| 3,730,216 | A | 5/1973 | Arnett et al. |
| 6,991,006 | B2 * | 1/2006 | Gramss et al. ................ 141/350 |
| 7,063,113 | B2 * | 6/2006 | Ropert et al. ................. 141/350 |
| 7,077,178 | B2 * | 7/2006 | Hedevang ..................... 141/367 |
| 7,302,977 | B2 * | 12/2007 | King et al. .................... 141/367 |
| 7,665,493 | B2 | 2/2010 | Groom et al. |
| 7,950,425 | B2 * | 5/2011 | Och .............................. 141/367 |
| 2009/0095373 | A1 | 4/2009 | Correira et al. |
| 2011/0132906 | A1 * | 6/2011 | Miller et al. ................. 220/86.2 |

FOREIGN PATENT DOCUMENTS

DE   4128128 A1   2/1993
DE   19645173 C1  4/1998
(Continued)

OTHER PUBLICATIONS

ISR fand Written Opinion for PCT/IB2009/053571.
(Continued)

*Primary Examiner* — Timothy L Maust
(74) *Attorney, Agent, or Firm* — Lowe Hauptman & Ham, LLP

(57) ABSTRACT

A filling neck to feed fuel into a motor vehicle tank using a filling nozzle, exhibiting the following features: a slotted drive ring comprising an insertion portion conically tapering toward the vehicle fuel tank, the cross-sectional constriction being less than the filling nozzle's cross-section; the drive ring, facing the fuel tank comprises, on at least one side of said gap, a locking segment; the drive ring is configured in floating manner in a cup-shaped housing portion of the filling neck, the outside diameter of said ring being less than the inside diameter of the cup-shaped housing portion; a sealing element is associated with the distal end of the drive ring, blocking access to the tank in its closed position; the drive ring's locking segment engages and keeps the sealing element in the locked position, and moves into the open position when said drive ring is expanded by the filling nozzle.

9 Claims, 3 Drawing Sheets

(56) References Cited

FOREIGN PATENT DOCUMENTS

| | | |
|---|---|---|
| DE | 102004002994 B3 | 9/2005 |
| DE | 102006031463 A1 | 1/2008 |
| EP | 1555154 A1 | 7/2005 |
| WO | 2007/012488 A1 | 2/2007 |

OTHER PUBLICATIONS

German Search Report for DE 10 2008 039 311.8.

* cited by examiner

FUELLING SYSTEM FOR FUELLING OF A VEHICLE TANK

RELATED APPLICATIONS

The present application is National Phase of International Application Number PCT/IB2009/053571, filed Aug. 12, 2009, and claims priority from, German Application Number 10 2008 039 311.8, filed Aug. 22, 2008.

The present invention relates to a filling neck, to feed fuel to a motor vehicle tank, as claimed in claim 1.

The diameters of gasoline fuel nozzles are usually smaller than those of diesel fuel nozzles. However diesel engines still can be erroneously fed with gasoline for lack of special precautions. The German patent document DE 10 2004 001 994 B3 discloses a fuel filling neck configuring a floating drive ring in a housing portion of the filling nozzle. This drive ring is fitted with a gap running axially and its outside diameter, in said ring's relaxed state, is less than the inside diameter of the said housing portion which is cup-shaped. At its end facing the tank, hereafter the distal [flow] end, the drive ring comprises a sealing flap which is spring-biased to block access to the tank. Said sealing flap shall be unlocked when the drive ring is radially expanded due to the fuel nozzle being forced inward. The filling nozzle makes it possible to pry open the inner sealing flap against the spring force.

This known filling neck does prevent erroneous fuel filling because only fuel nozzles of a predetermined diameter shall expand the drive ring whereas fuel nozzles of lesser diameters may pass through it unhampered and thereby come to rest against the sealed flap. If the fuel nozzle is opened nevertheless, the flap inside it shall close once because the fuel flow shall be dammed up.

This known design is especially suitable for so-called capless filling systems. The filling pipe in such designs is no longer sealed by a cap. Sealing is solely implemented by the internal sealing flap at the filling pipe.

The objective of the present invention is to improve a filling neck of the cited kind in that it may selectively be operated with or without said drive ring.

This problem is solved by the features of claim 1.

In the present invention, an affixation ring is detachable mounted on the drive ring's side opposite the sealing element in the filling neck. Said affixation ring affixes the drive ring oppositely the direction of insertion of the fuel nozzle.

Absent any further design features, the filling neck of the present invention allows inserting the drive ring from the outside into said neck. At its distal side, the said drive ring comes to rest against a stop and, at its opposite side, hereafter the proximal [flow] side, it shall be affixed by the affixation ring. Independently of such design features, the drive ring may be supported in more or less pronounced floating manner in the cup-shaped housing portion of the filling neck. The affixation ring is detached easily and thereby allows removing said drive ring from the filling neck for servicing. Accordingly the filling neck per se need not be disassembled. However, in very advantageous manner, the filling neck of the present invention also may be operated in the absence of a drive ring when the particular motor vehicle might be designed without protection against mis-fueling. In this latter case only the affixation ring is inserted and clamped because matching by its inside contour the desired inner contour of a filling neck that is configured for the particular fuel to be used.

The present invention also applies to cap-fitted tank filling necks.

A number of ways may be used to mount the affixation ring in simple manner within the filling neck. In an especially preferred embodiment mode of the present invention, the affixation ring is mounted by means of a bayonet lock on the filling neck. This feature eliminates the need for additional affixation ring elements. In some circumstances, said ring may even be inserted manually. To assure simple disengagement, one embodiment mode of the present invention the affixation ring is fitted at its end facing the insertion aperture with tool access means, if desired holes, allowing rotating said ring. In this manner the affixation ring may be disengaged from the bayonet lock by mere rotation.

In one embodiment mode of the present invention, the affixation ring is fitted at its outside with at least one radial boss to attain bayonet locking, said protrusion engaging a hook-like slot in the inside wall of the filling neck. Said slot may comprise an axial insertion segment and an adjoining circumferential element. Preferably this circumferential element is fitted near its end with a narrow cross-section requiring pressing the protrusion through it in order to move said boss as far as the end of the circumferential element. In this manner the affixation ring is held in its position and will not disengage by itself.

The drive ring also may be fitted in another embodiment mode of the present invention with means allowing removing it in simple manner from the filling neck for purposes of servicing. Also the drive ring may have to be removed when fuel nozzles of lesser diameters are used, as in several East European and Asian countries.

An illustrative embodiment mode of the present invention is elucidated below in relation to the appended drawings.

Figure 1:
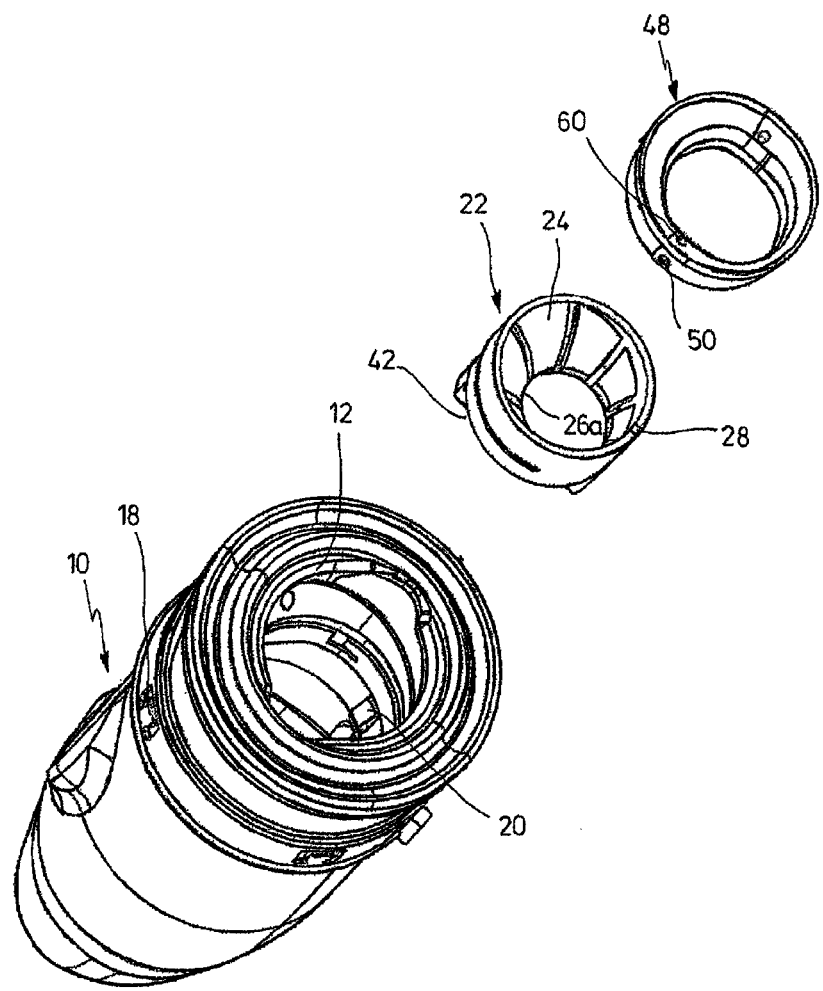
FIG. 1 is an exploded perspective of filling neck of the invention.
Figure 2:
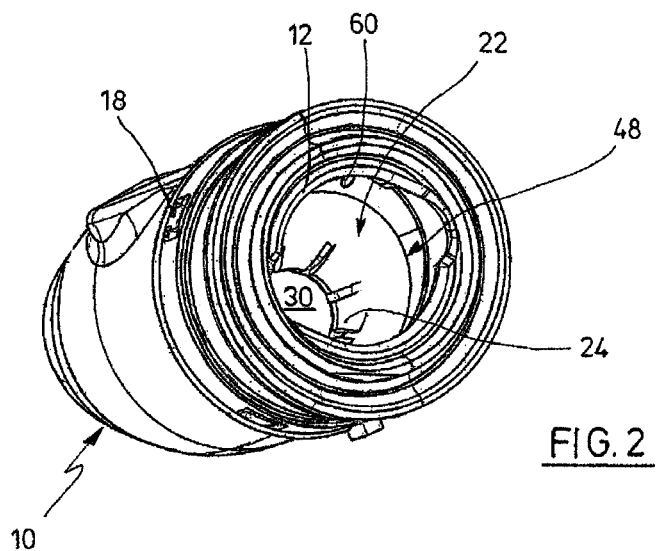
FIG. 2 shows the assembled parts of FIG. 1.
Figure 3:
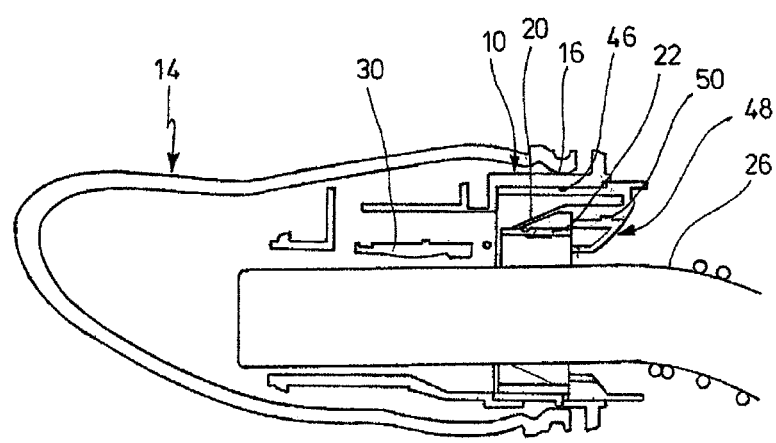
FIG. 3 is a longitudinal section of the filling neck of FIG. 2 with inserted fuel nozzle.

FIG. 1 shows a casing 10 of a filling neck comprising an insertion end 12. FIG. 3 shows the configuration of the casing 10 in a fuel filling pipe 14. FIG. 3 shows the configuration of the casing 10 within a filling pipe 14. The filling pipe 14 runs to an omitted motor vehicle tank and is kept in place in appropriate manner. At its free end said filling pipe is fitted with an inwardly pointing bead 16 operating in concert with resilient or spring tabs 18 on the outside of the plastic casing 10 to axially affix this casing. On its inside, the casing 10 is fitted with circumferentially spaced apart resilient or spring tabs 20 for a purpose elucidated below.

Figure 4:
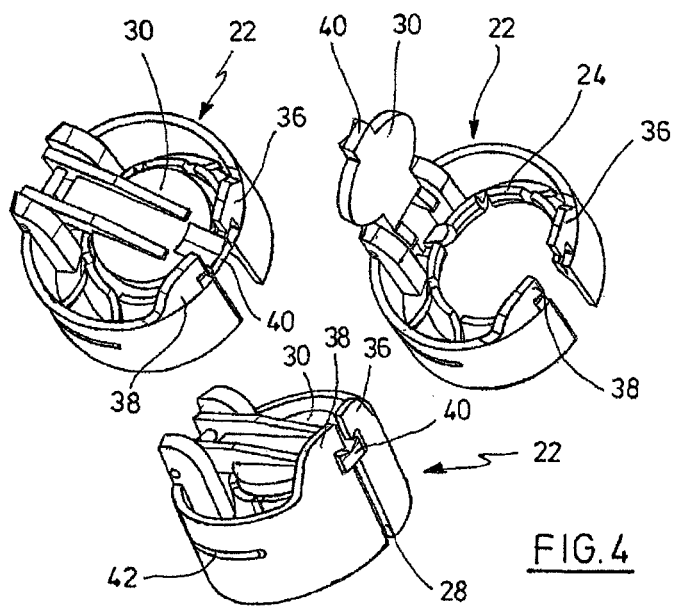
FIG. 4 is a perspective of the rear side of the drive ring of the filling neck of FIGS. 1 through 3 in different positions and drive settings.

FIG. 1 also shows a drive ring 22 comprising a circumferential series of segments 24 in an insertion portion, said segments tapering in the direction of insertion. This design subtends a circular, constricted cross-section 26a of which the diameter is smaller than that of a fuel nozzle 26 that shall be admissible to feed fuel to the vehicle equipped with the filling neck. The drive ring 22 comprises a slot 28 running parallel to ring's center axis. A sealing flap 30 pivotably rests at the distal end. It is kept in the closed position by an omitted spring. In that closed position and as indicated at the bottom of FIG. 4, this flap rests against the distal ends of the segments 24. At its distal end, the drive ring is fitted on both sides of the slot 22 with hook elements 36, 38 enclosing a radial extension 40 of the flap 30 for the purpose of locking this flap 30 in its closed position. This closed position is shown at the bottom of FIG. 4 wherein the flap 30 is locked by the hook elements 36, 38. The drive ring 22 is externally cylindrical and is externally fitted with a spring 42 radially biasing it in a manner that it shall assume the bottom position shown in FIG. 4. When, due to fuel nozzle insertion, the drive ring 22 is expanded, the hook elements 36, 38 move apart as indicated at the top left of FIG. 4. In this manner a fuel nozzle is able to open the flap 30 as shown at the top right of FIG. 4. However such a drive ring is already known.

Figure 5:
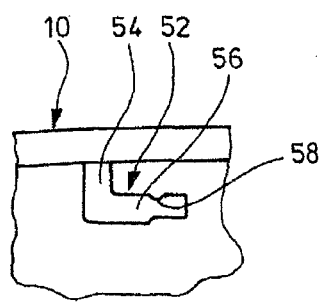
FIG. 5 shows the inner portion of the filling neck of FIG. 1 with a slot to attain bayonet locking.

FIG. 3 shows the configuration of the drive ring 22 within a cup-shaped housing portion 46. The drive ring is secured in place relative to the tank by further, omitted stops. However, within limits, the drive ring 22 is able to move radially, such radial displacements being damped by the spring tabs 20. The drive ring is secured in place relative to the filling aperture 12 by an affixation ring 48 which is also shown in FIG. 1. The contour of the inside of the affixation ring 48 is approximately oval, the cross-section being gradually constricting. Such a contour facilitates inserting the fuel nozzle 26 (FIG. 3). The affixation ring 48 is cross-sectionally circular and is fitted at its outside with two diametrically opposite small bosses 50 of which only one is visible in FIG. 1 respectively FIG. 3. The small bosses 50 may cooperate with hook-shaped slots in the inside wall of the casing near the filling aperture as indicated at 52 in FIG. 5. The slots 52 comprises an insertion portion 54 running parallel to the casing's center axis and a circumferential segment 56 fitted with a constriction 58 near the end. The affixation ring is inserted through the filling aperture 12 into the filling neck 10, the small bosses 50 being aligned with the insertion portions 54. Next the said ring is rotated slightly, as a result of which the small bosses 50 enter the circumferential portions 56. They overcome the constricted cross-section 58 and in this manner are affixed in the filling neck 10 in approximately secured manner.

Accordingly the drive ring 22 is fixed in position relative to the filling aperture 12 using the affixation ring 48. A drive ring is simply omitted where unnecessary and only the affixation ring 48 is rotated into position during assembly. When exchanging the drive ring 22 is required respectively the filling neck must be serviced, the drive ring 22 is very easily removed merely by loosening the affixation ring 48.

On its side facing the filling aperture 12, the affixation ring is fitted with diametrically opposite holes 60. A tool may thus be applied to loosen the affixation ring during assembly or dismantling. The drive ring 22 also may be fitted for instance with two holes to more easily assemble/dismantle it when the affixation ring 48 has been removed.

As already mentioned above, FIG. 3 shows the fuel nozzle 26 inserted in the filling neck 10. The filling nozzle's diameter being slightly larger than that of the narrower cross-section 58 of the drive ring 22, latter expands radially thereby and allows unlocking the sealing flap 30 as discussed above in relation to FIG. 4. As a result the sealing flap pivots into the open position. By actuation the filling nozzle, the fuel can be freely fed into the filling pipe 14. When the filling nozzle 26 is pulled out, the flap 30 automatically returns into its closed position where it is locked by the hooked portions 36, 38, as already elucidated in relation to FIG. 4.

The invention claimed is:

1. A filling neck to feed fuel into a motor vehicle tank using a filling nozzle, comprising:
    a slotted drive ring made of a resilient material or being radially prestressed and having a gap parallel to an axis of said slotted drive ring and comprising an insertion portion conically tapering toward the motor vehicle fuel tank, and further including a cross-sectional constriction being less than the filling nozzle's cross-section,
    the drive ring comprises a locking segment on at least one side of said gap at an end facing the fuel tank,
    the drive ring is configured in floating manner in a cup-shaped housing portion of the filling neck, said ring having an outside diameter being less than the inside diameter of the cup-shaped housing portion in a relaxed state,
    a sealing element is associated with a distal end of the drive ring and in a closed position blocks access to the tank,
    the locking segment engages the sealing element and keeps it in the locked position, the sealing element being moved out of a closed position into the open position when said drive ring is expanded by the filling nozzle and the locking segment releases the sealing element,
    wherein an affixation ring is detachably mounted, on the side of the drive ring opposite the sealing element, in the filling neck and clamps in place the drive ring relative to a direction opposite that of the direction of insertion of the filling nozzle.

2. The filling neck as claimed in claim 1, wherein the affixation ring-can be mounted in place in the filling neck using a bayonet lock.

3. The filling neck as claimed in claim 2, wherein the affixation ring is fitted with at least one radial boss on an outer part thereof and operating in concert with a hook-shaped slot in the inside wall of the filling neck.

4. The filling neck as claimed in claim 3, wherein the slot comprises an insertion zone parallel to said axis of said slot and an adjoining circumferential zone.

5. The filling neck as claimed in claim 4, wherein the circumferential zone of the slot assumes near a closed end a constriction which must be overcome by a protrusion when latter is displaced toward a sealed end of said circumferential zone.

6. The filling neck as claimed in claim 1, wherein the affixation ring is fitted at a side facing the filling aperture with means allowing access to a tool rotating said affixation ring.

7. The filling neck as claimed in claim 6, wherein at least one hole is configured into an end face of the affixation ring.

8. The filling neck as claimed claim 1, wherein circumferentially spaced apart resilient tabs are present in the wall of the cup-shaped housing portion and rest against the outside of the drive ring.

9. Filling neck as claimed in claim 1, wherein the drive ring is fitted on its side facing away from the fuel tank with means allowing a tool to access said ring.

* * * * *